United States Patent [19]

Forrester et al.

[11] Patent Number: 5,388,959

[45] Date of Patent: Feb. 14, 1995

[54] SEAL INCLUDING A NON-METALLIC ABRADABLE MATERIAL

[75] Inventors: James M. Forrester, Centerville, Ohio; Bradley R. Love, Altharetta, Ga.; Jack W. Baldwin, West Chester, Ohio

[73] Assignee: General Electric Company, Cincinnati, Ohio

[21] Appl. No.: 111,253

[22] Filed: Aug. 23, 1993

[51] Int. Cl.⁶ .............................................. F01D 11/08
[52] U.S. Cl. ................................. 415/173.4; 415/197
[58] Field of Search ................ 415/173.4, 174.4, 197, 415/200; 277/26, 53, DIG. 6

[56] References Cited

U.S. PATENT DOCUMENTS

| | | | |
|---|---|---|---|
| 3,346,175 | 10/1967 | Wiles | 415/173.4 X |
| 3,519,282 | 7/1970 | Davis | 277/230 |
| 3,547,455 | 12/1970 | Daunt | 277/96 |
| 3,843,278 | 10/1974 | Torell | 415/173.4 X |
| 3,854,843 | 12/1974 | Penny | 415/197 |
| 4,295,787 | 10/1981 | Lardellier | 415/197 |
| 4,460,185 | 7/1984 | Grandey | 415/174 |
| 4,536,127 | 8/1985 | Rossmann et al. | 415/174 |
| 5,064,727 | 11/1991 | Naik et al. | 415/173.4 |

*Primary Examiner*—Edward K. Look
*Assistant Examiner*—Michael S. Lee
*Attorney, Agent, or Firm*—Jerome C. Squillaro; Bernard E. Shay

[57] ABSTRACT

A fan assembly for a gas turbine engine for aircraft has a stator casing made of a first material and an annular abradable seal structure made of a second material comprising an epoxy foam having heat expandable, thermoplastic microballoons filled with a chemical which expands when the second material is cured such that the second material bonds directly to the stator casing upon curing thereby minimizing the number of processing steps during manufacture.

4 Claims, 2 Drawing Sheets

SEAL INCLUDING A NON-METALLIC ABRADABLE MATERIAL

BACKGROUND OF THE INVENTION

1. Field of the Invention

This invention relates to abradable seals and seal materials and, more particularly, to an abradable seal for the stator casing of a fan or a compressor of a gas turbine engine for aircraft.

2. Description of the Prior Art

In the conventional, relatively cooler operating portion of a gas turbine engine, an organic lightweight abradable material secured to the casing of the stator is used to provide an abradable rub surface to the ends of fan or compressor blades. As shown in U.S. Pat. No. 3,547,455, issued Dec. 15, 1970 to J. E. Daunt; U.S. Pat. No. 3,843,278, issued Oct. 22, 1974 to S. P. Totell; and U.S. Pat. No. 4,460,185, issued Jul. 17, 1984 to M. F. Grandey, the abradable material may consist of an epoxy resin or a halogenated hydrocarbon including chopped fiberglass or phenolic microballoons or both.

Typically, a rub shroud of epoxy with phenolic microballoons is used as a filler and is structurally supported by a plastic honeycomb structure which is fixed to the inner annular surface of the casing of the stator to provide a structure on which to build a thick layer of the microballoon abradable material. The honeycomb may be made from a polyamide or aramid paper sold by Dupont Chemical Company under the trademark "Nomex", which is formed into a honeycomb that is dipped into a phenolic resin to stiffen the structure and is sold by Hexcel Corp. under the trademark "HRH 10". The honeycomb is bonded directly to the surface of a layer of fiberglass that is then bonded to the surface of the stator casing. The layer of fiberglass provides a textured surface for the microballoon abradable material to bond to and a thermal barrier between the metal (e.g., aluminum, steel, or titanium,) casing and the microballoon abradable material. The abradable material has a much higher coefficient of thermal expansion of the two materials which can cause cracking of the abradable material as a result of CTE mismatch exposed to variations in temperature. As a result, the abradable material is prone to falling out of the honeycomb cells.

During manufacture, the abradable material must be troweled into the honeycomb cells in an operator sensitive operation that often leaves voids and empty spots in the honeycomb. The application of the fiberglass, the honeycomb structure, and the abradable material each require a separate cure cycle which further complicates the manufacturing process.

SUMMARY OF THE INVENTION

In carrying out this invention in one form thereof, an annular abradable seal structure is provided for an annular stator that is made from a material that has a first coefficient of thermal expansion and an annulus made of a second material having a second coefficient of thermal expansion which is similar to the first coefficient of thermal expansion. The annular abradable seal structure is a stator casing for a fan or compressor for a gas turbine engine and the annulus is an abradable material installed in the stator casing to provide a sealing surface for fan blades or compressor blades in the gas turbine engine. The abradable material has a smaller radius than the stator casing because it is installed on the interior surface of the annular stator casing. During normal operation, the annulus expands more than the stator casing which moderately compresses the annulus and prevents the annulus from deteriorating from over compression of the annulus when the temperature rises. The abradable material is a cured epoxy that has fibers that are uniformly distributed throughout the material and are randomly oriented to provide internal structural support. Also included are microballoons that are filled with a chemical that expands when the material is heat cured. The abradable material is bondable directly to the stator casing thereby minimizing the number of processing steps during manufacture.

The abradable material is light weight and can be easily abraded by the tips of passing fan or compressor blades. The epoxy resin filled with fibers and microballoons has a uniform density and is resistant to erosion and to solvents such as jet fuel and hydraulic fluid.

BRIEF DESCRIPTION OF THE DRAWING

These and other objects, advantages and features of the invention will be apparent from the specification taken in conjunction with the accompanying drawings in which.

DESCRIPTION OF THE INVENTION

Figure 1:
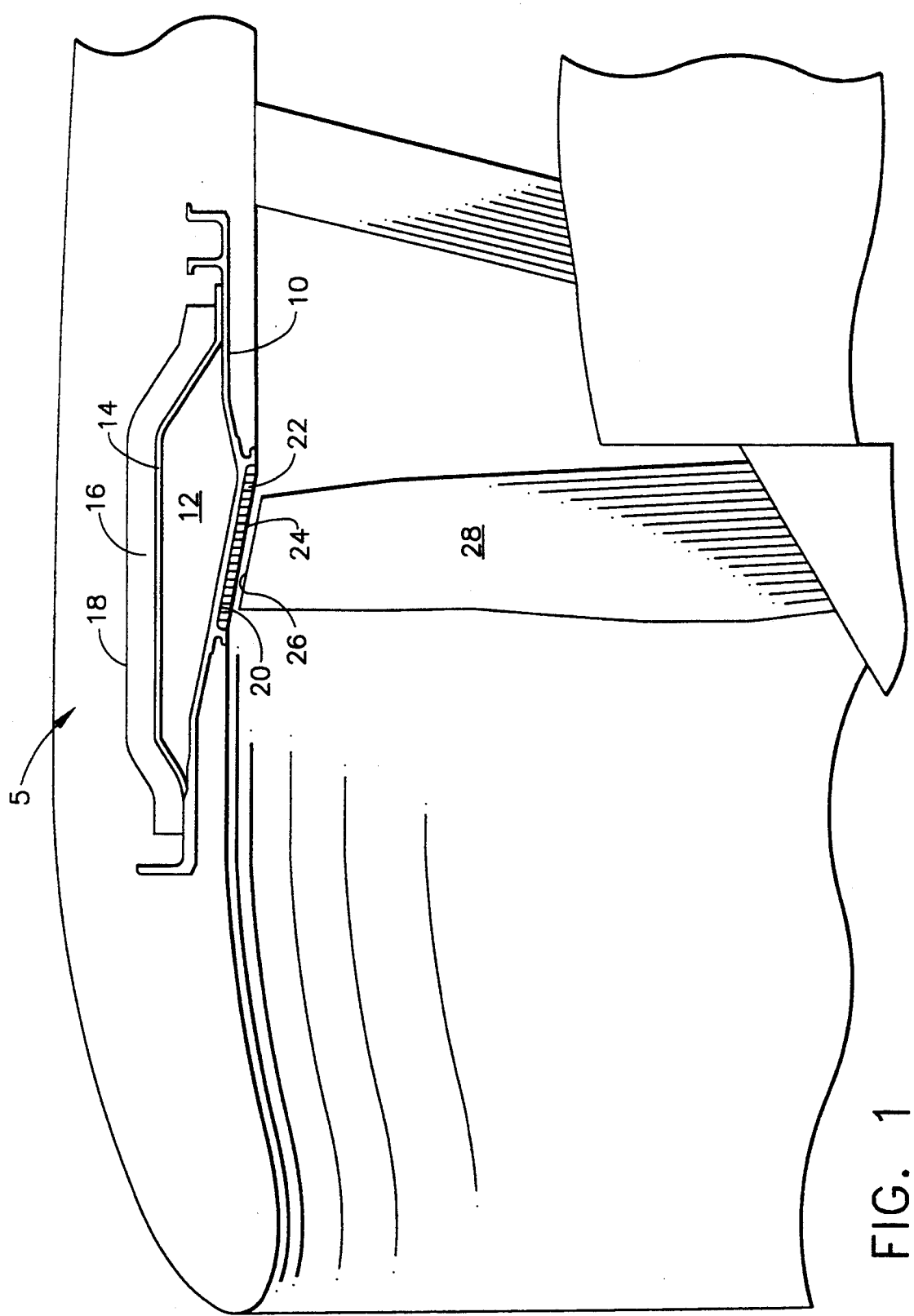
FIG. 1 illustrates a longitudinal section through the inlet upper portion of the fan module of a high bypass gas turbine engine, such as the CF6-80C2 engine.

In FIG. 1, fan module 5 includes an inner metal casing 10 made usually of aluminum, surrounded by an aluminum honeycomb 12, surrounded by a graphite epoxy outer casing 14, surrounded by a dry kevlar wrap 16, surrounded by a kevlar-epoxy cover 18. Casing 10 includes an inner annular groove 20 which is fixed to the annular abradable seal structure 22. Seal structure 22 provides an abradable inner annular surface 24 against which is juxtaposed tips 26 of fan blades 28 of rotor 30.

Figure 2:
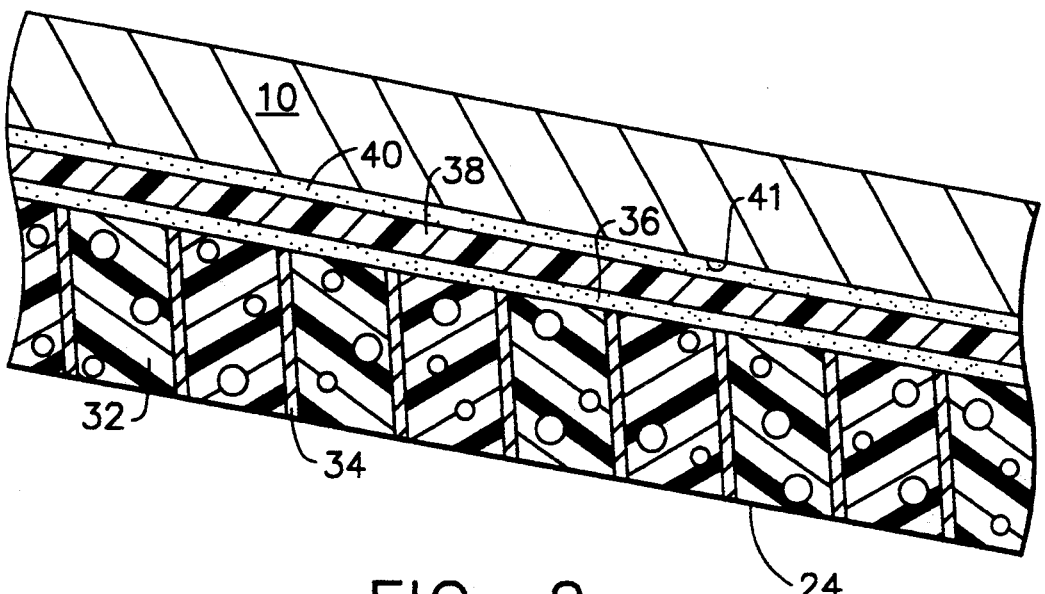
FIG. 2 illustrates a detail of a longitudinal cross section of the prior art seal structure fixed to the casing of the fan.

In FIG. 2, a typical prior art seal structure comprises an abradable material 32 of epoxy with phenolic microballoons disposed in and supported by an annular plastic honeycomb structure 34, bonded by adhesive 36 to an annular layer of fiberglass 38, bonded by adhesive 40 to inner annular surface 41 of casing 10. Abradable material 32 has a coefficient of thermal expansion which is much higher than the coefficient of thermal expansion of the metal of the casing. When the temperature rises, casing 10 expands much less than the assembly of abradable material 32 in honeycomb structure 34, then the assembly may crack due to over compression, and units of the abradable material 32 may fall out of their respective honeycomb cells 34.

The prior art abradable material 32 weighs 44 pounds per cubic foot. The material has to be troweled into cells 34, and the whole manufacturing process requires three separate curing cycles.

Figure 3:
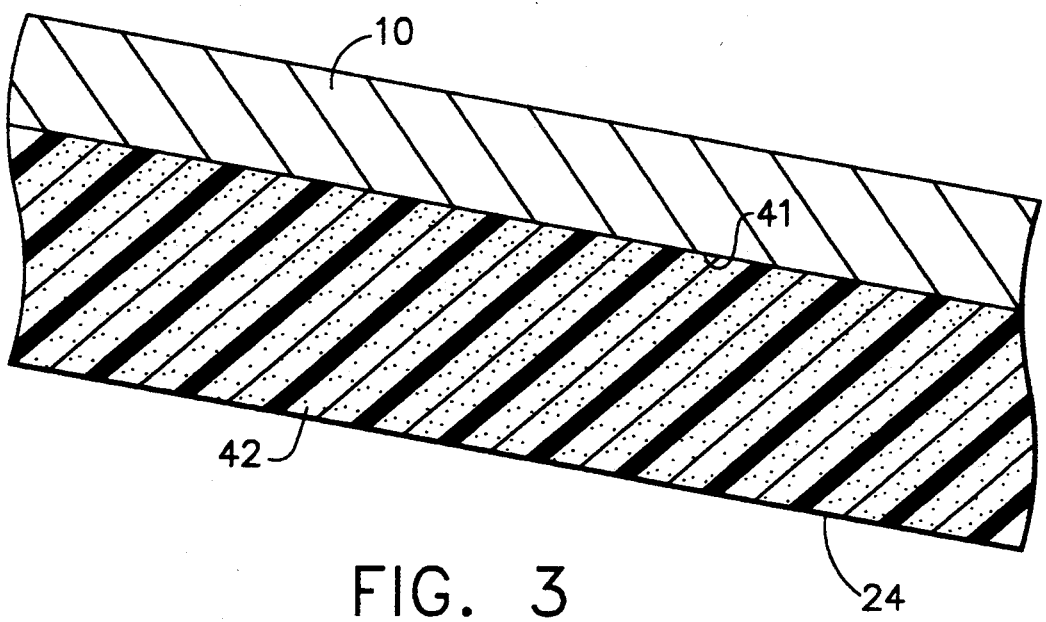
FIG. 3 illustrates a detail of a longitudinal cross section of a seal structure embodying the present invention as fixed to the fan stator casing.

FIG. 3 illustrates a seal structure which embodies the present invention. An annular sheet 42 of epoxy foam including chopped fiberglass reinforcing fibers and microballoons is directly bonded to the inner annular surface 41 of the inner annular groove 20 of the casing 10.

Sheet 42 serves as an abradable seal structure and provides abradable seal surface 24. The composition of sheet 42 is selected to have a coefficient of thermal expansion which is moderately greater than the metal of the casing. The fiberglass fibers are randomly disposed and oriented to provide internal structural support to the sheet. A preferred sheet material is available from the Dexter Hysol Corporation under their designation LN89104.3. This material consists of a tough, one component epoxy resin filled with short length fibers and heat expandable, thermoplastic microballoons. The microballoons contain a chemical that causes them to expand at temperatures between 200 degrees F. and 250 degrees F. The final cure temperature is 250 degrees F. During cure, epoxy foam material 42 expands to fill and conform to the shape of the groove 20. It is cured and self-bonded to casing groove 20 at 30 psi and 250 degrees F. for two hours. After cure, abradable inner annular surface 24 is machined to the accuracy required for the application. The material has a coefficient of thermal expansion in the range of 22E-6 to 27E-6 inch per inch degrees Fahrenheit. This is twice that of aluminum at 12.25E-6 inch per inch degrees Fahrenheit. Aluminum has the highest coefficient of thermal expansion of materials typically used as a casing. Therefore, abradable structure 42 will not crack during heat cycle expansion of the casing in normal operation. Epoxy foam material 42 has a density of 25 pounds per cubic foot, compared to the typical prior art material 32 of 44 pounds per cubic foot, thereby providing a typical weight saving of 5.5 pounds per seal structure. Epoxy foam material 42 also has a low void content in the cured state, good resistance to erosion and solvents and has a rub force of 35 pounds, compared to the typical rub force of 90 pounds for prior art material 32, which reduces the rub load transmitted to casing 10 by 60%.

Although the present invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention;

We claim:

1. A sealed fan assembly comprising:

an annular stator casing made of a first material;

a lightweight annular abradable seal structure made of a second material different from said first material, said second material comprising of an epoxy foam containing heat expandable, thermoplastic microballoons filled with a chemical which expand when cured, said seal structure being applied to said stator caseing and cured thereto, whereby:

a. the expanding microballoons cause the second material to fill in gaps and crevices in said first material, resulting in a continuous ring of the second material bonded directly to the first material of the stator casing without need for any additional bonding agents; and whereby:

b. the thermoplastic microballoons will produce rounded edges upon wear shear to thereby avoid wear on non-metallic rotor blades.

2. The assembly of claim 1 wherein:

the second said material includes fibers randomly disposed and oriented therein whereby:

a. the fibers protrude from the abradable seal structure as the epoxy foam is worn away by contact with the rotor blades, increasing resistance to seal erosion; and whereby:

b. the fibers provide internal structural support to the abradable seal structure, such that the said abradable seal structure is bonded directly to said stator casing in one continual ring without additional structural support.

3. The assembly of claim 1, wherein the second said material has a coefficient of thermal expansion slightly greater to the coefficient of thermal expansion of said first material.

4. The assembly of claim 1, wherein:

said stator casing has an inner annular surface for receiving said seal structure; and said seal structure is bonded directly to said stator casing inner surface.

* * * * *